United States Patent
Horiguchi

(10) Patent No.: US 7,424,272 B2
(45) Date of Patent: Sep. 9, 2008

(54) FOLDABLE PORTABLE CELLULAR PHONE

(75) Inventor: Masuyo Horiguchi, Saitama (JP)

(73) Assignee: NEC Corporation, Tokyo (JP)

( * ) Notice: Subject to any disclaimer, the term of this patent is extended or adjusted under 35 U.S.C. 154(b) by 817 days.

(21) Appl. No.: 09/920,966

(22) Filed: Aug. 3, 2001

(65) Prior Publication Data

US 2002/0019216 A1 Feb. 14, 2002

(30) Foreign Application Priority Data

Aug. 9, 2000 (JP) ............................. 2000-241715

(51) Int. Cl.
*H04M 3/42* (2006.01)
*H04M 1/00* (2006.01)
*H04B 1/38* (2006.01)

(52) U.S. Cl. .................. 455/90.1; 455/90.3; 455/415; 455/567; 455/575.3

(58) Field of Classification Search ............... 455/90, 455/567, 300, 414.4, 461, 90.1, 90.3, 415, 455/575.3; 379/100.14, 373.02, 142.01, 379/201.05, 215.01; 340/7.53, 7.39
See application file for complete search history.

(56) References Cited

U.S. PATENT DOCUMENTS

| | | | |
|---|---|---|---|
| 5,394,140 A | | 2/1995 | Wong et al. |
| 5,463,687 A | | 10/1995 | Takizawa ............. 379/433 |
| 5,634,196 A | | 5/1997 | Alford |
| 5,673,308 A | * | 9/1997 | Akhavan ............. 455/461 |
| 5,821,874 A | * | 10/1998 | Parvulescu et al. ...... 340/7.53 |
| 5,966,647 A | * | 10/1999 | Sawai .................. 455/300 |
| 6,009,338 A | | 12/1999 | Iwata et al. |
| 6,094,565 A | | 7/2000 | Alberth et al. |
| 6,125,264 A | * | 9/2000 | Watanabe et al. ....... 340/7.39 |
| 6,208,879 B1 | | 3/2001 | Iwata et al. |
| 6,252,949 B1 | * | 6/2001 | Chishaki et al. ........ 379/100.14 |

(Continued)

FOREIGN PATENT DOCUMENTS

EP 0 867 844 A2 9/1998

(Continued)

OTHER PUBLICATIONS

Z. Cole et al., "Two-way Radio with Tone Customization," Motorola Technical Developments, vol. 40, Jan. 2000, pp. 91-92, XP-000937325.

*Primary Examiner*—Thjuan K Addy
(74) *Attorney, Agent, or Firm*—Foley & Lardner LLP

(57) ABSTRACT

A foldable portable cellular phone capable of identifying a transmitter of an incoming call to which a response has not yet been made is provided. The above phone includes a telephone directory memory in which a plurality of kinds of incoming sounds each being associated with each of two or more transmitters is registered, a control section to store, when an incoming call that arrived while the foldable portable cellular phone was folded has not yet been responded to, incoming call history information about the transmitter, into an incoming call history storing area and a switch to search, when the incoming call that arrived while the foldable portable cellular phone was folded has not been yet responded to, for the incoming call history storing area. The foldable portable cellular phone is so configured that, when the incoming call that arrived while the foldable portable cellular phone was folded has not yet been responded to, it causes a ringer generator to output incoming sound corresponding to transmitters.

11 Claims, 7 Drawing Sheets

U.S. PATENT DOCUMENTS

| | | | |
|---|---|---|---|
| 6,347,136 B1 * | 2/2002 | Horan | 379/142.01 |
| 6,438,392 B1 * | 8/2002 | Toba | 455/567 |
| 6,535,749 B1 | 3/2003 | Iwata et al. | |
| 6,542,591 B1 * | 4/2003 | Amro et al. | 379/142.01 |
| 6,560,467 B1 * | 5/2003 | Kim | 455/567 |
| 6,603,848 B1 * | 8/2003 | Winnett | 379/215.01 |
| 6,671,370 B1 * | 12/2003 | Heinonen et al. | 379/373.02 |
| 6,799,034 B2 * | 9/2004 | Higuchi et al. | 455/414.4 |
| 6,807,259 B1 * | 10/2004 | Patel et al. | 379/142.01 |
| 6,920,211 B2 * | 7/2005 | Pelletier et al. | 379/201.05 |
| 2003/0008679 A1 | 1/2003 | Iwata et al. | |
| 2003/0133558 A1* | 7/2003 | Kung et al. | 379/215.01 |

FOREIGN PATENT DOCUMENTS

| | | |
|---|---|---|
| FR | 2 748 176 | 10/1997 |
| GB | 2 339 648 | 2/2000 |
| JP | 6-164712 | 6/1994 |
| JP | 10-42022 | 2/1998 |
| JP | 10-70750 | 3/1998 |
| JP | 10-215303 | 8/1998 |
| JP | 10-327219 | 12/1998 |
| JP | 11-308669 | 11/1999 |
| JP | 11-341110 | 12/1999 |
| JP | 2000-69158 | 3/2000 |
| JP | 2000-138972 | 5/2000 |
| WO | WO 96/27974 | 9/1996 |

* cited by examiner

1; main body
4; side key
2; lid body
3; incoming call lamp
5; transmitting and receiving antenna 21; magnet
22; lead switch
23; detecting unit

*FIG.4* telephone directory memory

| | name | telephone number | incoming sound |
|---|---|---|---|
| 1. | Aka Satana | 090-**-** | incoming sound A |
| 2. | Hama Yarawa | 090-××××-×××× | incoming sound B |
| 3. | Iki Shichini | 090-####-#### | incoming sound C |
| 4. | Himii Rii | 090-∞∞∞∞-∞∞∞∞ | incoming sound D |
| 5. | Ukusu Tsune | 090-△△△△-△△△△ | incoming sound E |
| ... | | | |
| 10. | Fumu Yuruu | 090-○○○○-○○○○ | incoming sound 1 |
| 11. | Eke Setene | 090-◎◎◎◎-◎◎◎◎ | incoming sound 2 |
| 12. | Nohomo Yoroo | 090-◇◇◇◇-◇◇◇◇ | incoming sound 3 |

FOLDABLE PORTABLE CELLULAR PHONE

BACKGROUND OF THE INVENTION

1. Field of the Invention

The present invention relates to a foldable portable cellular phone, and more particularly, to a foldable portable cellular phone configured so as to be able to receive a telephone call even while the foldable portable cellular phone is folded.

The present application claims priority of Japanese Patent Application No. 2000-241715 filed on Aug. 9, 2000, which is hereby incorporated by reference.

2. Description of the Related Art

A foldable portable cellular phone has come into widespread use (the foldable portable cellular phone hereinafter may be simply referred to as a "portable cellular phone"). FIG. 11A and FIG. 11B are schematic perspective views of an appearance of a conventional foldable portable cellular phone. As shown in FIG. 11A, the conventional portable cellular phone is so constructed that its main body 51 has a speech function and is integrally connected to a lid body 52 through a hinge 53. The lid body 52 can be rotated around the hinge 53 relative to the main body 51. While a telephone call is in progress, as shown in FIG. 11A, the lid body 52 is opened relative to the main body 51 and, while the telephone call is not in progress, as shown in FIG. 11B, the lid body 52 is folded.

The main body 51 is provided with a transmitting and receiving antenna 54 configured so as to be freely expandable and contractible, a receiver 55, a display 56, and an information inputting key 57. The lid body 52 is provided with a transmitter 58. The conventional foldable portable cellular phone having such configurations as above, can be reduced in size by folding the lid body 52 while the telephone call is not in progress. Therefore the portable cellular phone can be easily put in a pocket, bag, or a like and can provide portability to a user.

One example of such the foldable portable cellular phone as described above is disclosed in Japanese Patent Application Laid-open No. 2000-69158. The disclosed portable cellular phone is configured so that, while the portable cellular phone is being folded, howling that occurs, possibly due to an approach between transmitter and receiver, can be prevented, and so that operation of the portable cellular phone is halted to reduce current consumption. Generally, the foldable portable cellular phone is configured so that a state of being able to receive a call is maintained even while the portable cellular phone is being folded unless power is turned OFF. However, in the above disclosed portable cellular phone, its operation is halted while the portable cellular phone is being folded, which causes half its use value to be lost.

Therefore, generally, in the foldable portable cellular phone, since, while the portable cellular phone is being folded, an incoming sound rings at a time of receipt of a call, even if the portable cellular phone is being put in the pocket, bag, or the like so long as the power is ON, a user can come to know that the portable cellular phone has received a telephone call. This can provide convenience to the user.

However, the conventional foldable portable cellular phone has problems in that, in a state in which contents displayed on a screen of the portable cellular phone can not be seen, it is difficult for the user to identify calling parties that have been stored in a history of unanswered received calls. In the conventional foldable portable cellular phone, as described above, since the state of being able to receive a call is maintained even while the portable cellular phone is being folded unless the power is turned OFF, even when the portable cellular phone is put in the pocket, bag, or the like, the phone rings at the time of the receipt of the call, thus informing the user of the receipt of the telephone call from someone. However, since the user cannot see contents displayed on the screen of the portable cellular phone while the portable cellular phone is folded, the user can not identify the calling parties, that is, the parties who placed the unanswered telephone calls. Therefore, to identify the calling party, the user has to take out the portable cellular phone from the pocket, bag, or the like whenever the portable cellular phone receives the call and also has to open the lid body to view the contents displayed on the screen of the portable cellular phone, which causes handling of the portable cellular phone to be complicated.

Furthermore, in a case of users with visual impairments, even while the lid body of the foldable cellular phone is opened, they can not read the displayed contents. This is actually the same as the above case in which the displayed contents cannot be seen because the portable cellular phone is folded, thus making it difficult for such users to identify the calling parties. Accordingly, emergence of a foldable portable cellular phone is expected which enables the user to easily identify received calls stored in a history of received calls that remain unresponded to, even while the user cannot view contents displayed on the screen of the portable cellular phone.

SUMMARY OF THE INVENTION

In view of the above, it is an object of the present invention to provide a foldable portable cellular phone which enables a user to identify received calls stored as a history of unanswered received calls, even when the user cannot view a content displayed on a screen of the foldable portable cellular phone.

According to a first aspect of the present invention, there is provided a foldable portable cellular phone being constructed integrally of a main body with a speech function, a lid body foldable relative to the main body, and of a screen to display operational contents. The phone include: a foldable portable cellular phone being constructed integrally of a main body with a speech function, a lid body foldable relative to said main body, and a screen to display operational contents, comprising:

a telephone information registering unit including a telephone directory memory in which a plurality of different sounds are stored so as to be associated with a corresponding plurality of pre-registered calling parties;

a control section to store in a call history storing area in a storing unit call history information about an unanswered call that was received while said foldable portable cellular phone was folded;

a key operative to provide control signals to said control section to cause said control section to search said call history storing area in said control section and said telephone directory memory and, upon a match resulting from said searching, cause to output one of said plurality of sounds which corresponds to a pre-registered calling party stored in said telephone directory memory;

wherein, when an unanswered call that was received while said foldable portable cellular phone was folded, a sound corresponding to the party that called is output through operation of said key, whereby each of a plurality of different calling parties may be identified by each of a plurality of different sounds in response to operation of said key.

In the foregoing, a preferable mode is one wherein the key is so configured as to have a function of, causing to output a sound corresponding to a calling party that called prior to another calling party by activating the key successively two or more times.

Also, a preferable mode is one wherein the lid body or the main body is provided with a detecting unit used to detect an opening and closing state of the lid body, wherein, when the lid body is opened, a detection signal is fed to the control section from the detecting unit to make reset the call history information stored in the control section.

Also, a preferable mode is one wherein the sound is produced by a ringer generator.

Also, a preferable mode is one wherein vibration is employed instead of the incoming sound.

Also, a preferable mode is one wherein vibration is employed in addition to the incoming sound.

Also, a preferable mode is one wherein a registered name corresponding to a calling party registered in the telephone information registering unit and is output from a ringer generator instead of the incoming sound.

Furthermore, a preferable mode is one wherein the time stored in the incoming call history storing area is employed in addition to the incoming sound.

With the above configurations, since the foldable portable cellular phone has the telephone information registering unit on which a plurality of kinds of incoming sounds each being assigned so as to be associated with each of a plurality of expected calling parties are pre-registered, the control section is used to store, when the incoming call that arrived while the portable cellular phone was folded has not yet been answered, incoming call history information about the calling party, into the incoming call history storing area. The key has the function of searching for the incoming call history storing area in the telephone information registering unit and in the control unit and of outputting the incoming sound corresponding to the calling party. Further, since the foldable portable cellular phone is so configured that, when the incoming call that arrived while the portable cellular phone was folded has not yet been answered, the sound corresponding to the calling party is output by the operation of the above key. The transmitter of the incoming call can then be identified without need for seeing contents displayed on the display device. Therefore, even in a state in which contents displayed on the display device cannot be viewed, the party who called, but whose call was unanswered can be easily identified.

BRIEF DESCRIPTION OF THE DRAWINGS

The above and other objects, advantages, and features of the present invention will be more apparent from the following description taken in conjunction with the accompanying drawings in which:

FIG. 4 is a diagram explaining an operation principle of the foldable portable cellular phone according to the first embodiment of the present invention;

DETAILED DESCRIPTION OF THE PREFERRED EMBODIMENTS

Best modes of carrying out the present invention will be described in further detail using various embodiments with reference to the accompanying drawings.

First Embodiment

Figure 1:
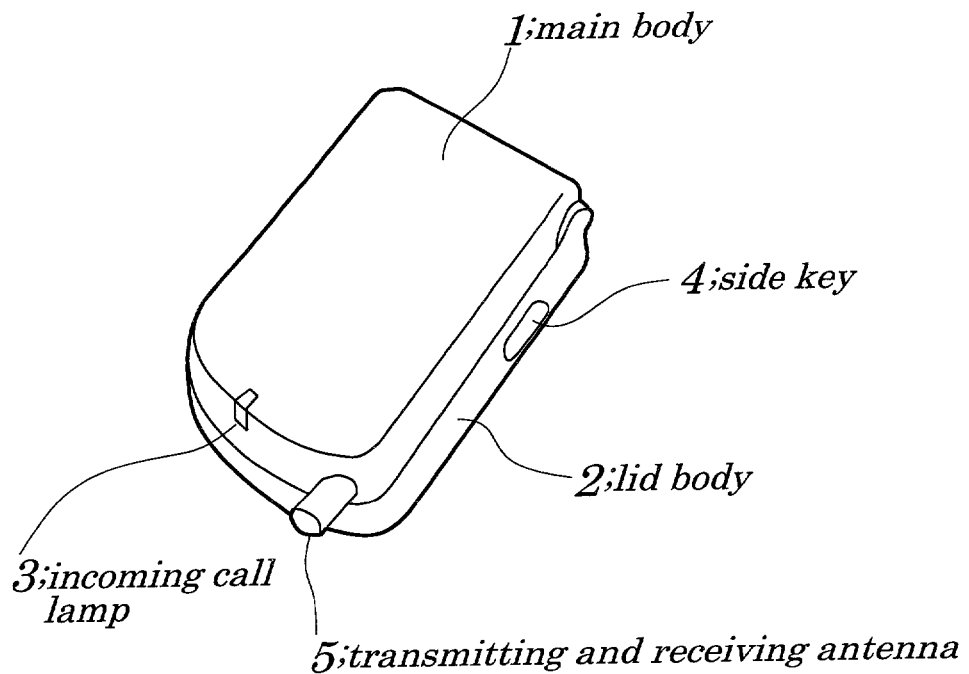
FIG. 1 is a schematic perspective view of an appearance of a foldable portable cellular phone according to a first embodiment of the present invention.
Figure 2:
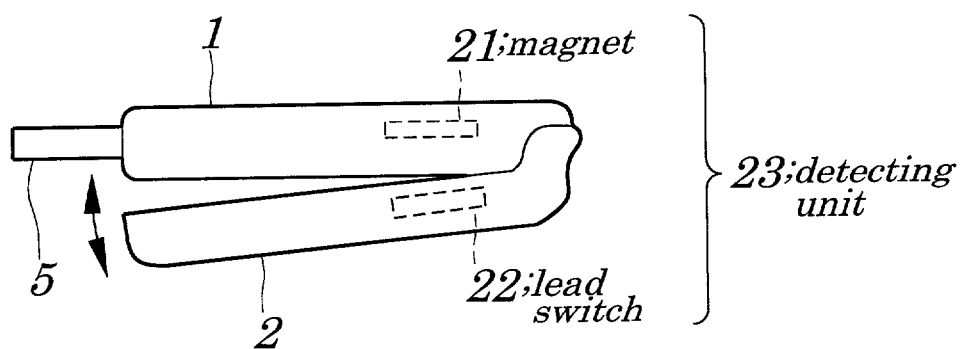
FIG. 2 is a schematic side view of the appearance of the foldable portable cellular phone according to the first embodiment and a third embodiment of the present invention.
Figure 3:
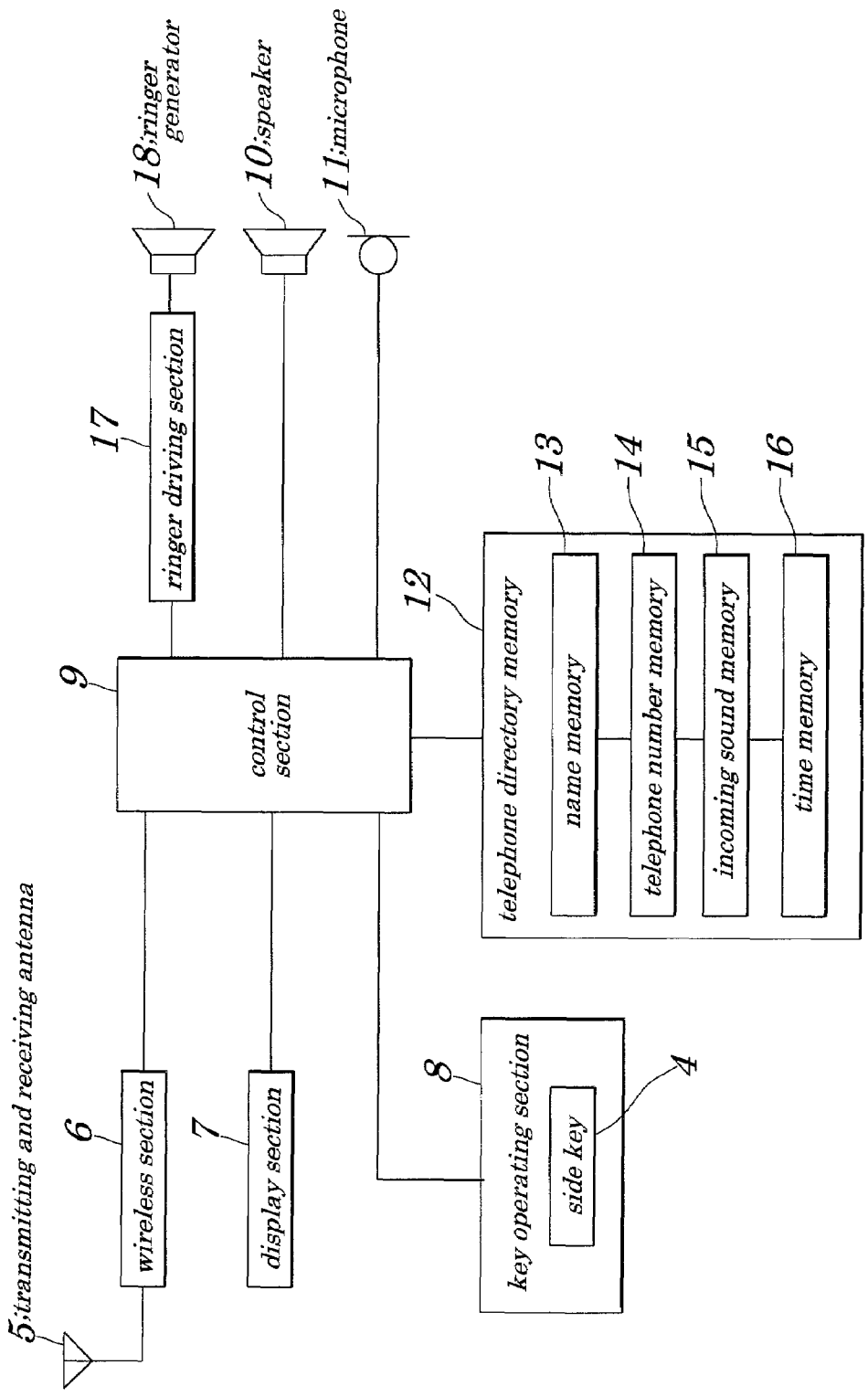
FIG. 3 is a schematic block diagram describing configurations of the foldable portable cellular phone according to the first embodiment of the present invention.
Figure 5:
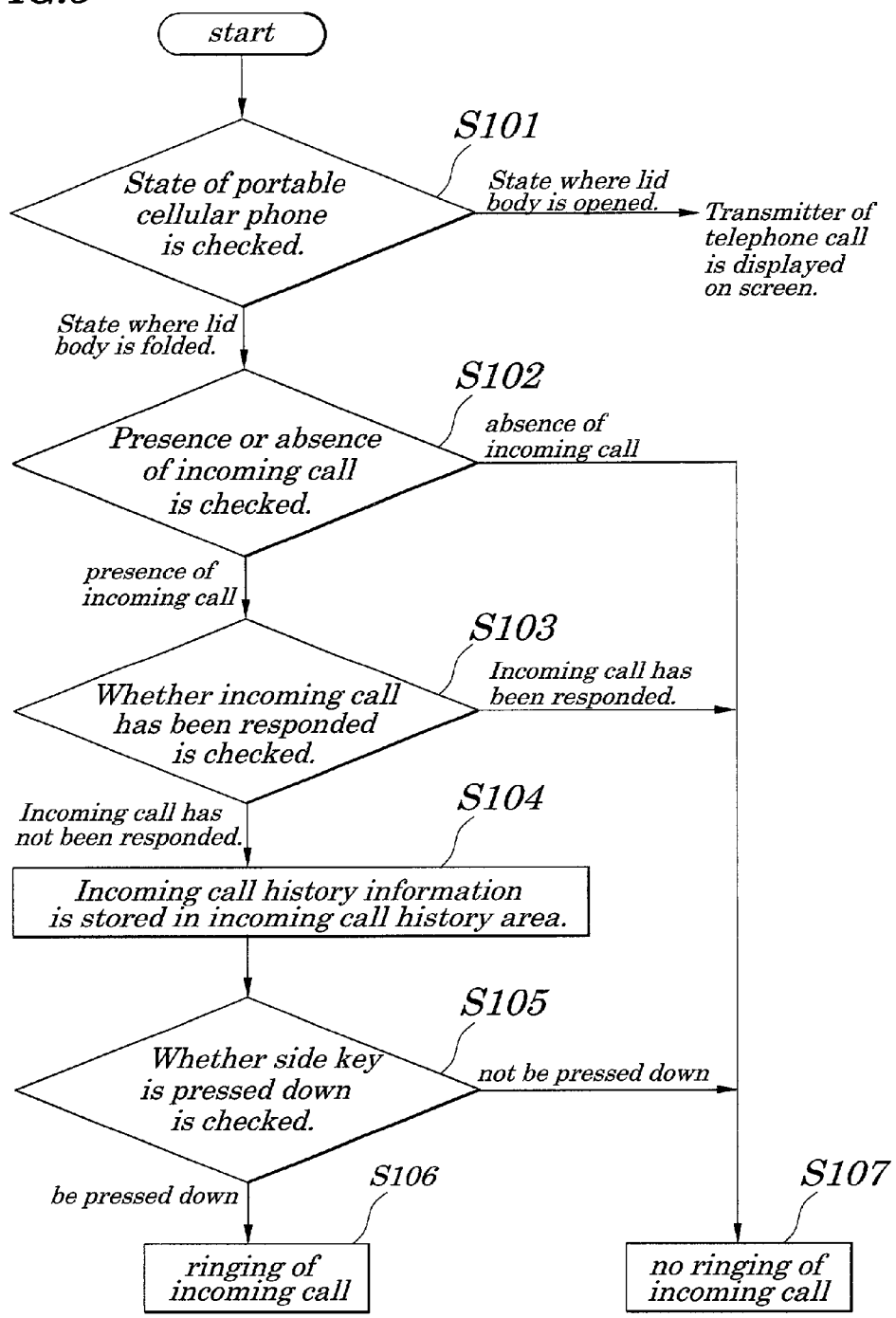
FIG. 5 is a flowchart explaining operations of the foldable portable cellular phone according to the first embodiment of the present invention.

FIG. 1 is a schematic perspective view of an appearance of a foldable portable cellular phone according to a first embodiment of the present invention. FIG. 2 is a schematic side view of the appearance of the foldable portable cellular phone according to the first embodiment. FIG. 3 is a schematic block diagram describing configurations of the foldable portable cellular phone according to the first embodiment. FIG. 4 is a diagram explaining an operation principle of the foldable portable cellular phone according to the first embodiment. FIG. 5 is a flowchart explaining operations of the foldable portable cellular phone according to the first embodiment. As shown in FIG. 1, the foldable portable cellular phone of the first embodiment is so constructed that its main body 1 is integrally connected to a lid body 2 through a hinge (not shown) and that the lid body 2 can be rotated around the hinge relative to the main body 1. The main body 1 has an incoming call lamp 3 and a transmitting and receiving antenna 5 configured so as to be freely expandable and contractible. The lid body 2 has a side key 4 with a function described later. Thus, FIG. 1 shows the appearance of one example of the foldable portable cellular phone in a folded state.

Moreover, as shown in FIG. 2, the foldable portable cellular phone of the embodiment has a magnet 21 in its main body 1 and a lead switch 22, in a position opposite to the magnet 21, in its lid body 2. These magnet 21 and lead switch 22 make up a detecting unit 23 in a pair. Since the lead switch 22 is turned ON and OFF in response to a distance to and from the magnet 21, an opening and closing state of the lid body 2 can be detected by the detecting unit 23. Each of the magnet 21 and the lead switch 22 may be mounted on either of the main body 1 or lid body 2.

The foldable portable cellular phone of the embodiment, as shown in FIG. 3, includes the transmitting and receiving antenna 5 used to transmit or receive a signal, a wireless section 6 used to modulate or demodulate a signal, a display section 7 made up of an LED (Light-Emitting Diode) device, a liquid crystal or a like used to display an operation content, a key operating section 8 containing a side key 4 used to input necessary information such as telephone information to a telephone directory memory 12, and a control section 9 containing a CPU (Central Processing Unit) used to perform controlling operations on the entire components and to store information about a telephone call that arrived while the portable cellular phone was folded and has not yet been answered, in a call history storing area in a memory which stores call history information about calling parties. A ringer generator 18 is adapted to output a sound by being driven by a ringer driving section 17 when the call that arrived while the portable cellular phone was folded has not yet been responded to. A speaker 10 is used to output a received voice. A microphone 11 is used to input a voice to be transmitted. The telephone directory memory 12 is used to pre-register the telephone information through operations of the key operating section 8.

The telephone directory memory 12 is so configured that telephone information made up of various pieces of data for a plurality of expected calling parties is pre-registered through operations of the key operating section 8. The telephone directory memory 12 includes a name memory 13 used to register names of the calling parties, a telephone number memory 14 used to register telephone numbers of the calling parties, a sound memory 15 used to register a sound corresponding to the calling party and a time memory 16 used to register the time of receiving the call. That is, as shown in FIG. 4 as examples, both telephone numbers and sounds each being assigned so as to be associated with each of the calling parties are set and registered on the telephone directory memory 12. For example, a sound A is associated with (1) Mr. Aka Satana, a sound D with (4) Mr. Himi Rii and a sound 2 with (11) Mr. Eke Setene. Thus, a plurality of kinds of sounds each being assigned so as to be associated with each of a plurality of calling parties is registered on the telephone directory memory 12. The sound can be constructed by using, for example, kinds of melodies or kinds of tones, or by combining both.

Moreover, when calls that arrived while the portable cellular phone was folded that have not yet been answered, information about the history of the calls, including names of the calling parties, telephone numbers, sounds, times, or the like, are stored in the call history storing area in the memory installed in the control section 9.

The side key 4 of the key operating section 8 has a function by which, when the call that arrived while the portable cellular phone was folded has not yet been answered, when the side key 4 is pressed down, an operation signal from the side key 4 operation is input to the control section 9 which causes call history information stored in the call history storing area in the memory installed in the control section 9 and the telephone information stored in the telephone directory memory 12 to be searched for, based on control by the control section 9. Based on the search result, the ringer driving section 17 is driven to cause the ringer generator 18 to output a sound corresponding to the calling party. Therefore, when the call that arrived while the portable cellular phone was folded, by operating the side key 4 and based on control of the control section 9, the ringer generator 18 rings the sound corresponding to the calling party.

Next, operations of the foldable portable cellular phone of the embodiment will be described by referring to the flowchart in FIG. 5.

First, the user checks a state of the lid body 2 of the portable cellular phone (Step S101). In a state where the lid body 2 is opened, the content displayed on the display section 7 can be seen and therefore the routine is terminated. On the other hand, when the lid body 2 is folded, contents displayed on the display section 7 cannot be seen and therefore the routine proceeds to a next flow to check presence or absence of a received calls (Step S102).

In the case of the absence of the received call, since no problem exists, the flow is terminated (Step S107). In the case of the presence of a received call, the user checks whether the received call has been answered to or not (Step S103). When the received call has been answered, since speech has ended and no problem exists and the flow is terminated accordingly. In the case of the absence of the response to the received call, that is, when the received call has not yet been answered, the call history information is stored in the call history storing area in the memory installed in the control section 9 (Step S104).

Next, whether or not the side key 4 is pressed down is checked (Step S105). When the side key 4 is not pressed down, the flow is terminated. When the side key 4 is pressed down, a the control section 9 causes the ringer generator 18 to provide the sound corresponding to the called party rings (Step S106). Therefore, the user can identify the calling party by hearing the sound, without the need for seeing contents displayed on the display section 7.

As described above, according to the foldable portable cellular phone of the embodiment, since the user can identify the calling party hearing the sound, without the need for seeing contents displayed on the display section 7, the user can be free from complicated processing in which the portable cellular phone has to be taken out from a pocket or a like every time the call arrives and has to open the lid body 2 to see contents displayed on the display section 7 every time the call arrives, which provides ease of use. Moreover, even if the user has visual impairment, since seeing contents displayed on the display section 7 is not required, the user can easily identify the calling party.

Second Embodiment

Figure 6:
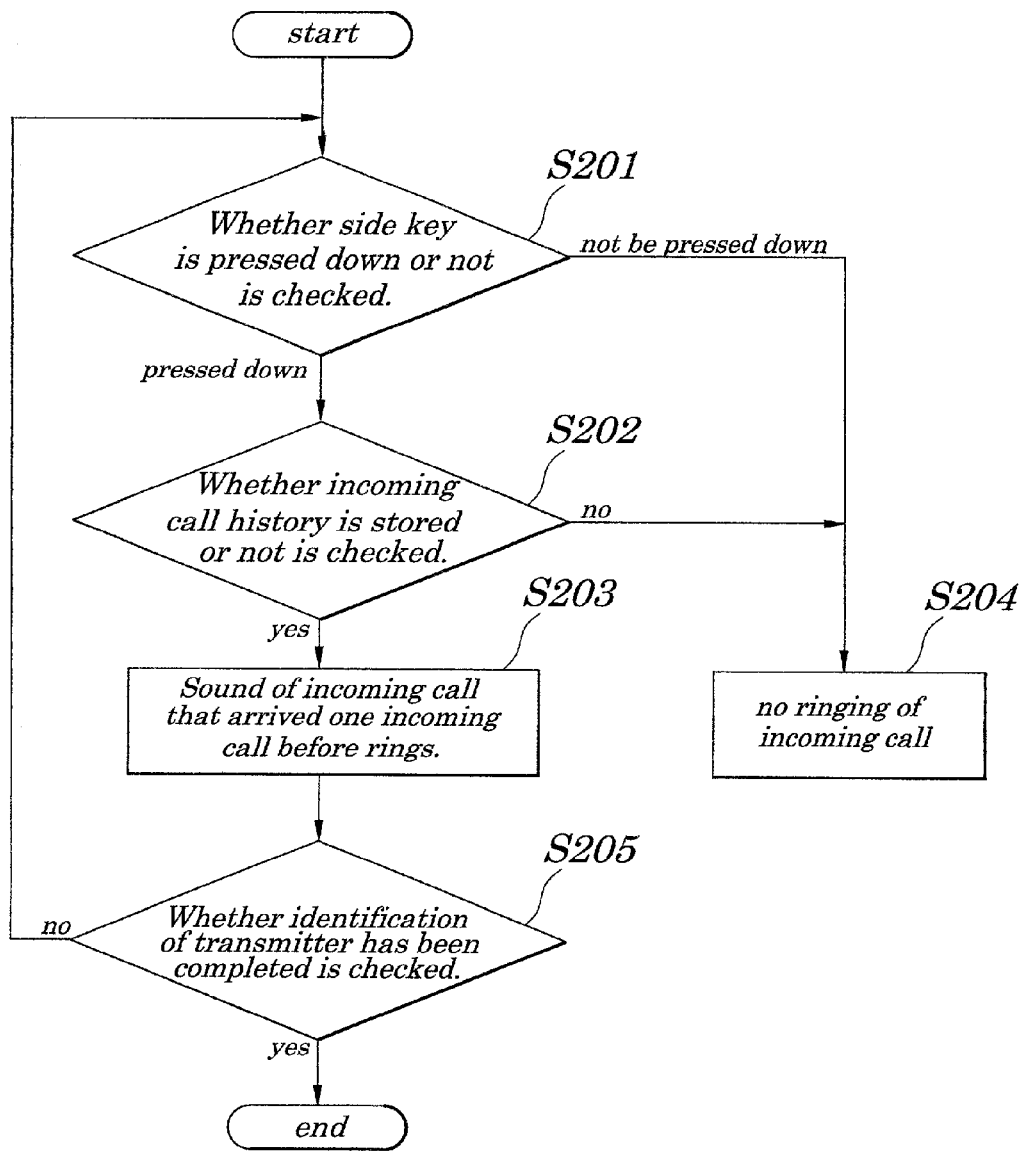
FIG. 6 is a flowchart explaining operations of a foldable portable cellular phone according to a second embodiment of the present invention.

FIG. 6 is a flowchart explaining operations of a foldable portable cellular phone according to a second embodiment. The foldable portable cellular phone of the second embodiment differs greatly from that in the first embodiment in that its side key 4 has a function of identifying a call that was received prior to another call. That is, in the second embodiment, when unanswered calls while the foldable portable cellular phone was folded, if the side key 4 is pressed down twice, each of operation signals induced by pressing of the side key 4 is input to a control section 9. Based on the control of the control section 9, both the call history information stored in an call history storing area in memory installed in the control section 9 and the telephone information stored in the telephone directory memory 12 are searched. Based on the search result, a ringer driving section 17 is driven to cause a ringer generator 18 to output a sound corresponding to the call that arrived one call before another.

When unanswered calls that were received while the portable cellular phone was folded, by pressing down the side key 4 twice, based on the control of the control section 9, a sound corresponding to the call that arrived one call before another unanswered call is produced through operation of the ringer generator 18.

Next, operations of the foldable portable cellular phone of the second embodiment will be described by referring to the flowchart in FIG. 6. First, whether a user presses down the side key 4 or not is checked (Step S201). If the user does not press down the side key 4, since there is no need for identifying the calling party the sound does not ring (Step S204).

When the side key 4 has been pressed down, whether the call history information is stored in the call history storing area in the memory installed on the control section 9 is checked (Step S202).

If the call history information is not stored, since the sound is not output, the flow is terminated (Step S204) accordingly. If the call history information is stored, a sound corresponding to the call that arrived one call before another call is rang through operations of the ringer generator 18 (Step S203). Next, whether the identification of the calling party has been completed or not is judged (Step S205). If the identification of the calling party has been completed, the flow is terminated. When the identification of the calling party has not been completed, the routine returns to Step S201 and the operations are repeated until the identification is completed.

Thus, in the second embodiment, the same effects as obtained in the first embodiment can be achieved. Additionally, according to the second embodiment, since the transmitter of the incoming call that arrived one incoming call before another can be identified.

Third Embodiment

The foldable portable cellular phone of a third embodiment is so configured, as shown in FIG. 2, that a magnet 21 is embedded in a main body 1 and a lead switch 22 is embedded, in a position opposite to the magnet 21, in a lid body 2. The magnet 21 and the lead switch 22, in a pair, makes up a detecting unit 23. In the third embodiment, when the lid body 2 is opened, a control signal in response to an opening operation of the lid body 2 is input from the lead switch 22 to a control section 9 in order to reset call history information stored in a received call history storing area in a memory installed on the control section 9, that is, to make the history information invalid. This enables the call history information stored in the call history storing area in the memory installed on the control section 9 to be made invalid by simply opening the lid body 2, which allows the call history storing area to be utilized effectively.

Thus, in the third embodiment, the same effects as obtained in the first embodiment can be achieved. Additionally, simply by opening the lid body 2, the incoming call history information stored in the memory installed on the control section 9 can be easily reset.

Fourth Embodiment

Figure 7:
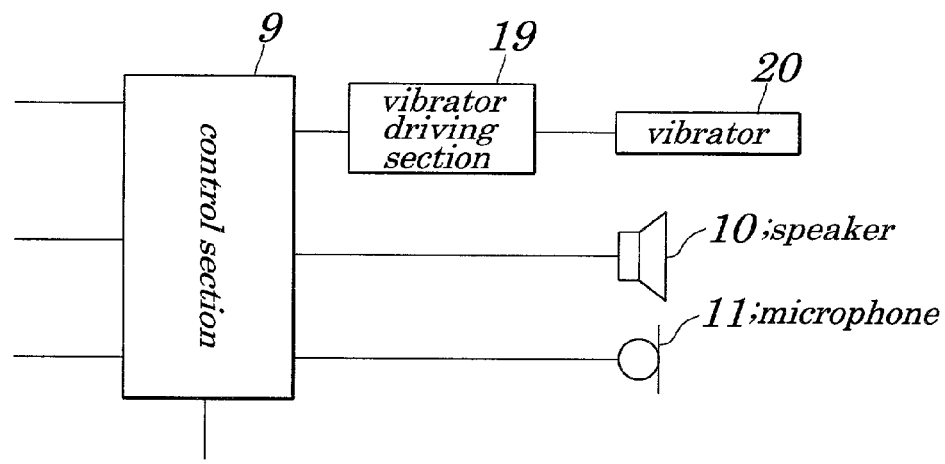
FIG. 7 is a schematic block diagram describing configurations of a foldable portable cellular phone according to a fourth embodiment of the present invention.

FIG. 7 is a schematic block diagram describing configurations of a foldable portable cellular phone according to a fourth embodiment. Configurations of the foldable portable cellular phone of the fourth embodiment differ greatly from those in the first embodiment in that identification of calling party is performed by using vibration of a vibrator 20, instead of sounds. That is, in the embodiment, when the call that was received while the portable cellular phone was folded has not yet responded to, by operating a side key 4 (FIG. 1), the vibrator 20 is driven, based on control by a control section 9, by a vibrator driving section 19 to cause the vibration corresponding to the calling party to occur. In this case, as a method for generating the vibration corresponding to the calling party by the vibrator 20, a method that has been implemented by vibration technology can be employed.

Thus, by identifying the transmitter of the incoming call using the vibration of the vibrator 20, the use of the portable cellular phone is made possible in a silent atmosphere in which ringing of such the incoming call causes inconvenience to other.

Therefore, in the fourth embodiment, the same effects as obtained in the first embodiment can be achieved. Additionally, since the transmitter of the incoming call can be identified, the portable cellular phone can be used without causing inconvenience to others.

Fifth Embodiment

Figure 8:
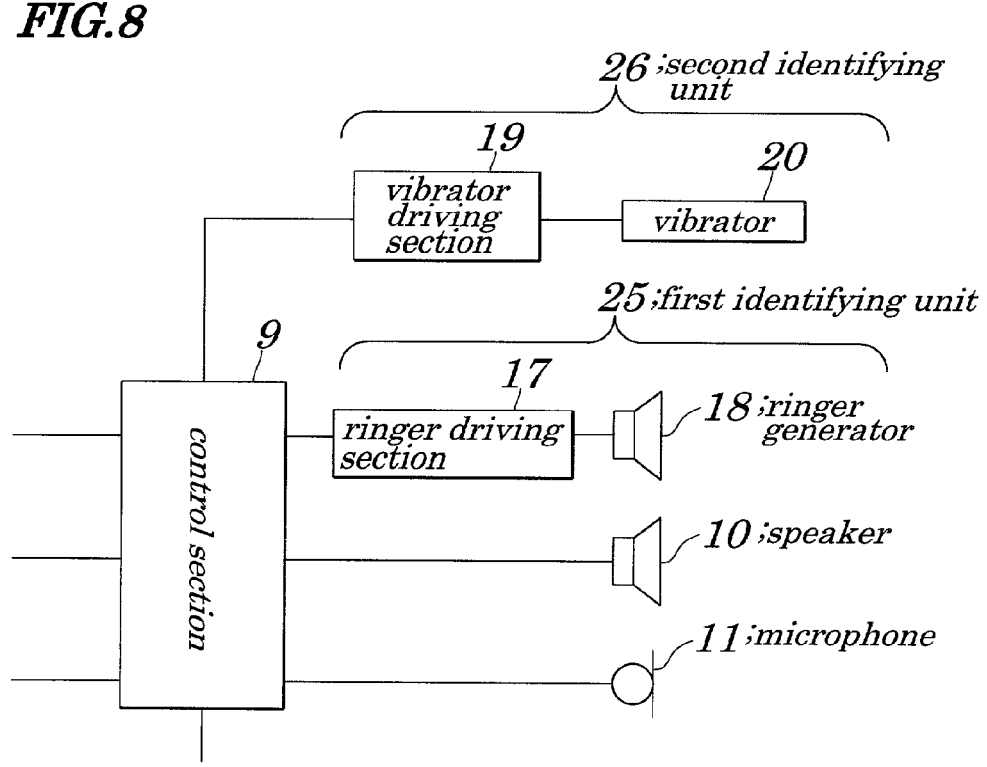
FIG. 8 is a schematic block diagram describing configurations of a foldable portable cellular phone according to a fifth embodiment of the present invention.

FIG. 8 is a schematic block diagram describing configurations of a foldable portable cellular phone according to a fifth embodiment of the present invention. The foldable portable cellular phone of the fifth embodiment differs greatly from that of the first embodiment in that two kinds of systems are provided to identify a calling party. That is, in the fifth embodiment, by taking note of a fact that the call includes not only a telephone call but also E-mail (electronic mail) as shown in FIG. 8, a first identifying unit 25 made up of a combination of a ringer driving section 17 and a ringer generator 18 to identify the calling party of a telephone call and a second identifying unit 26 made up of a combination of a vibrator driving section 19 and a vibrator 20 to identify the calling party of the E-mail are provided.

Figure 9:
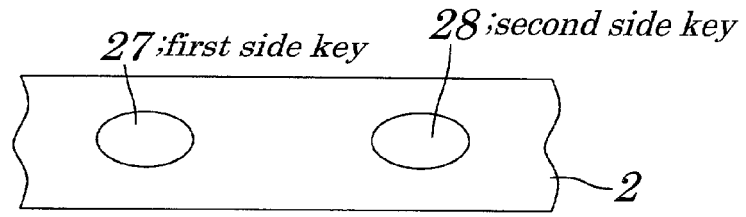
FIG. 9 is a schematic side view describing configurations of the foldable cellular phone according to the fifth embodiment of the present invention.
Figure 10:
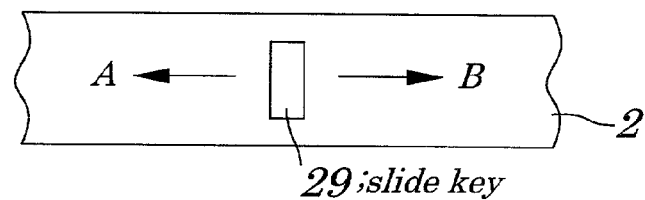
FIG. 10 is a schematic side view describing configurations of the foldable cellular phone according to the fifth embodiment of the present invention.
Figure 11A:
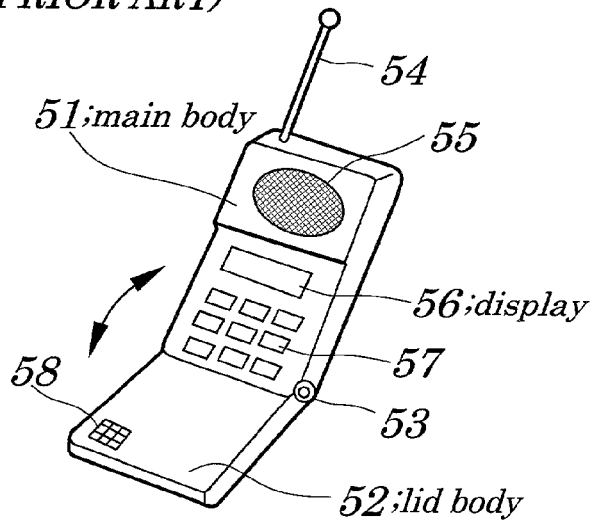
FIG. 11A and FIG. 11B are schematic perspective views of an appearance of a conventional foldable portable cellular phone.
Figure 11B:
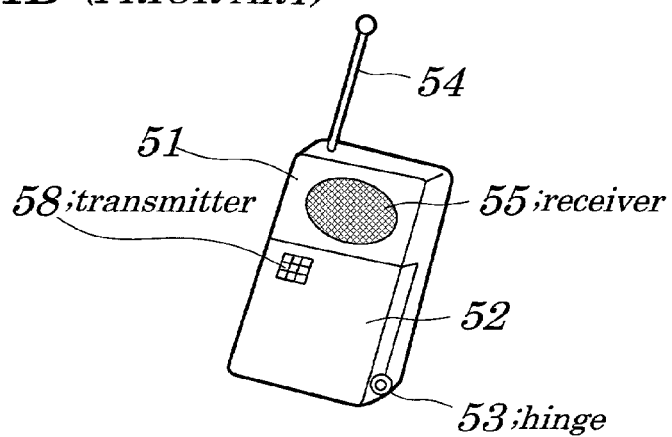

In this case, as shown in FIG. 9, a lid body 2 is so configured to have a first side key 27 used to operate the first identifying unit 25 and a second side key 28 used to operate the second identifying unit 26. These first and second side keys 27 and 28 may have functions opposite to each other, that is, the first side key 27 may operate the second identifying unit 26 and the second side key 28 may operate the first identifying unit 25. Moreover, a slide key 29, as shown in FIG. 10, may be mounted on the lid body 2. The slide key 29 can be so configured that it can have the same function as the above first side key 27 if the slide key 29 is slid, for example, toward an A direction and it can have the same function as the above second side key 28 if the slide key 29 is slid, for example, toward a B direction. The first and second side keys 27 and 28 or the slide key 29 may be mounted not only on the lid body 2 but also on a main body 1.

According to the configurations of the fifth embodiment, when the first identifying unit 25 is selected, the ringer generator 18 is driven, thus enabling the incoming telephone call to be checked easily. When the second identifying unit 26 is selected, the vibrator 20 is driven, enabling the incoming E-mail to be easily checked.

Thus, in the fifth embodiment, the same effects as obtained in the first embodiment can be achieved. Additionally, in the fifth embodiment, since two kinds of systems to identify the transmitter are provided, two types of incoming signal information can be checked.

It is apparent that the present invention is not limited to the above embodiments but may be changed and modified without departing from the scope and spirit of the invention. For example, in the above second embodiment, the call that arrived prior to another call before is checked. However, the side key 4 may have functions of checking the call that arrived several calls before, that is, calls that arrived two or more calls earlier. Moreover, the two kinds of systems including the ringer driving section 17/ringer generator 18 and the vibrator driving section 19/vibrator 20 provided in the fifth embodiment may be so configured that either of these two systems may identify the calling party of either of the telephone call or the E-mail.

What is claimed is:

1. A foldable portable cellular phone being constructed integrally of a main body with a speech function, a lid body foldable relative to said main body, and a screen to display operational contents, comprising:

a telephone information registering unit including a telephone directory memory in which a plurality of different sounds are stored so as to be associated with a corresponding plurality of pre-registered calling parties;

a control section to store, in an incoming call history storing area in a storing unit, incoming call history information about an unanswered call that was received while said foldable portable cellular phone was folded;

a key operative to provide control signals to said control section to cause said control section to search said incoming call history storing area in said control section and said telephone directory memory and, upon a match resulting from said searching, cause to output one of said plurality of sounds which corresponds to a pre-registered calling party stored in said telephone directory memory, said key being configured to be operated by a called party;

wherein, when the unanswered call that was initiated by one of the plurality of pre-registered calling parties was received while said foldable portable cellular phone was folded, one of the plurality of different sounds stored in the telephone directory memory that corresponds to the one of the plurality of pre-registered calling parties that initiated the unanswered call is output through operation of said key, whereby each of a plurality of different calling parties that respectively correspond to respective ones of the plurality of pre-registered calling parties may be identified by each of a plurality of different sounds being output in response to operation of said key.

2. The foldable portable cellular phone according to claim 1, wherein said control section is configured to cause to output another one of said plurality of different sounds corresponding to a second one of said pre-registered calling parties who called prior to a first one of said pre-registered calling parties in response to multiple successive operations of said key.

3. The foldable portable cellular phone according to claim 1, further comprising a detecting unit configured to detect whether said lid body has been opened or closed, wherein, when said lid body is opened, a detection signal is fed to said control section from said detecting unit to reset said incoming call history information stored in said control section.

4. The foldable portable cellular phone according to claim 1, wherein said sounds are produced by a ringer generator.

5. The foldable portable cellular phone according to claim 1, wherein vibration is employed in addition to said sounds.

6. The foldable portable cellular phone according to claim 1, wherein said incoming call history information includes the name of a calling party.

7. The foldable portable cellular phone according to claim 1, wherein said incoming call information history includes the time an unanswered call was received.

8. The foldable portable cellular phone according to claim 2, wherein said sounds are produced by a ringer generator.

9. A method of controlling operation of a foldable portable cellular phone having a main body with a speech function, a lid body that is foldable relative to said main body, and a key operative to provide control signals to a control section in said body, said method comprising:

assigning a plurality of different sounds corresponding to a plurality of calling parties;

storing, in a telephone information registering unit including a telephone directory memory, said assigned sounds in association with telephone numbers of the corresponding plurality of calling parties;

storing, in an incoming call history storing unit, incoming call history information including telephone numbers of received calls;

in response to actuation of said key by a called party, searching for said telephone number of a given received call in said telephone directory memory and in said call history storing unit and, upon a match resulting from said searching, outputting one of said plurality of sounds which corresponds to a specific one of said plurality of calling parties that initiated said received call as stored in said telephone directory memory;

determining whether a caller corresponding to the unanswered call that was made to the portable cellular phone when the portable phone was folded matches information stored in the telephone directory memory, and causing a ringing generator of the portable cellular phone to produce a particular sound corresponding to the caller of the unanswered call when there is a match; and determining whether a sender of an e-mail to the portable phone when the portable phone is folded matches information stored in an e-mail directory memory, and causing a vibration generator of the portable cellular phone to produce a particular vibration corresponding to the sender of the e-mail when there is a match, wherein when the sender is matched to a first name stored in the e-mail directory memory, a first vibration pattern is generated, and when the sender is matched to a second name stored in the e-mail directory memory different from the first name, a second vibration pattern different from the first vibration pattern is generated, wherein each of a plurality of different calling parties may be identified by outputting a respective one of the plurality of different sounds that are stored in the telephone information registering unit.

10. The portable phone according to claim 1, wherein, when m unanswered calls were received while said foldable portable cellular phone was folded, m being a positive integer greater than one, and upon operation of the keypad m consecutive times by the called party, a sound corresponding to a calling party of one of the m unanswered calls that was received by said foldable portable cellular phone prior to any of the other m-1 unanswered calls, is output through operation of said key.

11. The portable phone according to claim 1, further comprising:

a ringing generator for producing different sounds;

a vibration generator for producing vibrations;

a first identifying unit configured to determine whether a caller corresponding to the unanswered call that was made to the portable phone when the portable phone was folded matches information stored in the telephone directory memory, and to cause the ringing generator to produce a particular sound corresponding to the caller of the unanswered call when there is a match; and a second identifying unit configured to determine whether a sender of an e-mail to the portable phone when the portable phone is folded matches information stored in an e-mail directory memory, and to cause the vibration generator to produce a particular vibration corresponding to the sender of the e-mail when there is a match, wherein when the sender is matched to a first name stored in the e-mail directory memory, a first vibration pattern is generated, and when the sender is matched to a second name stored in the e-mail directory memory different from the first name, a second vibration pattern different from the first vibration pattern is generated.

* * * * *